Figure 1:
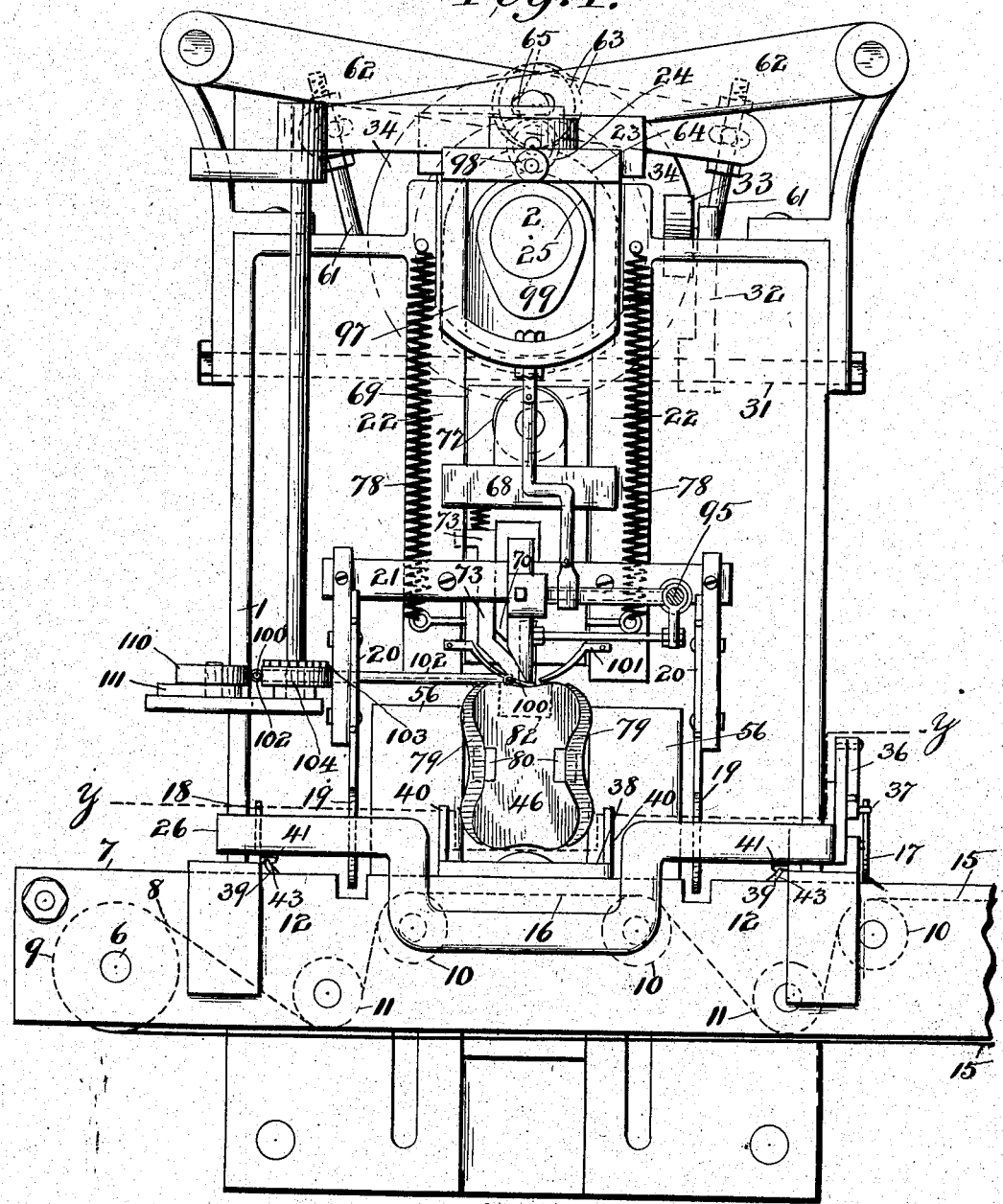

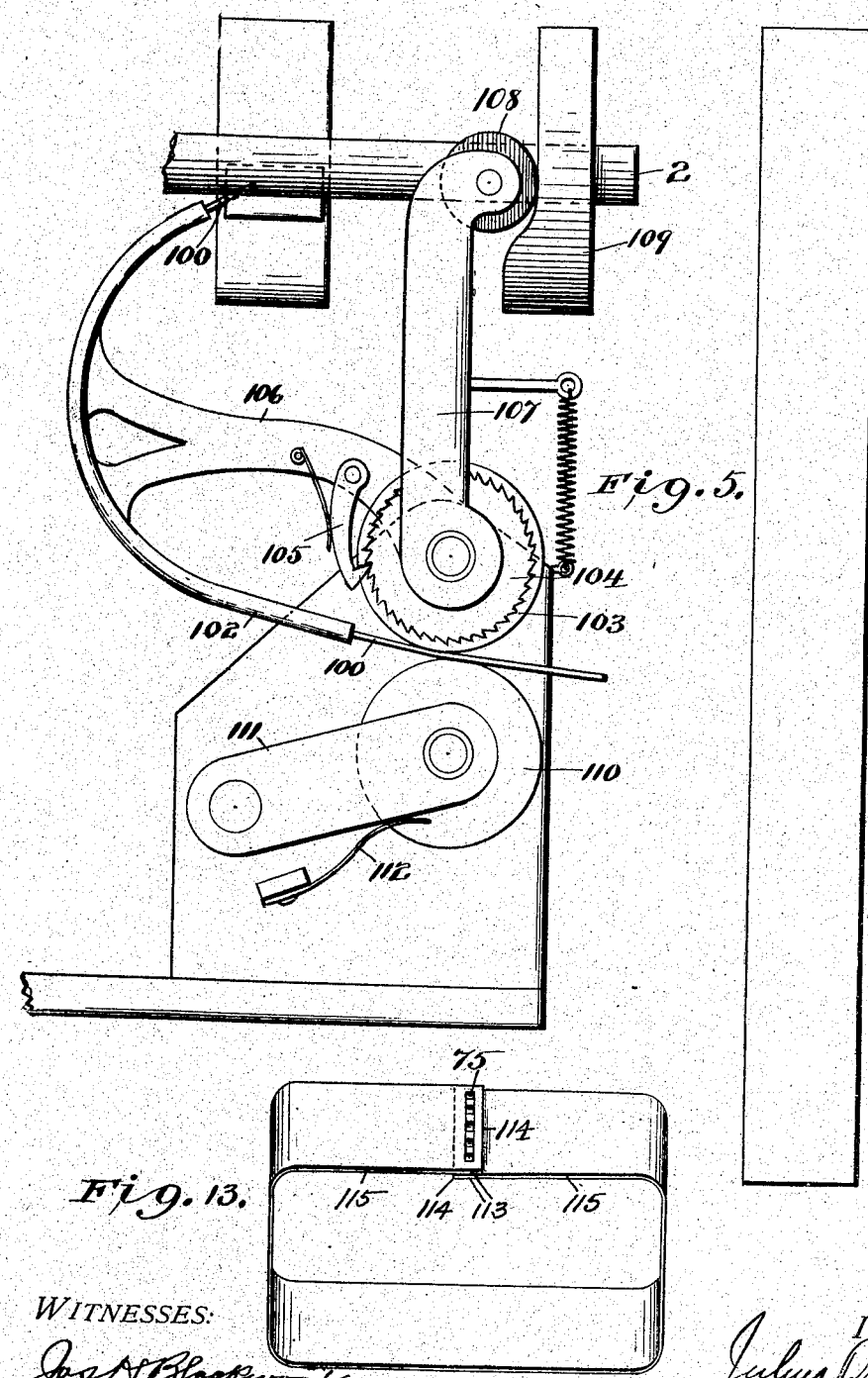

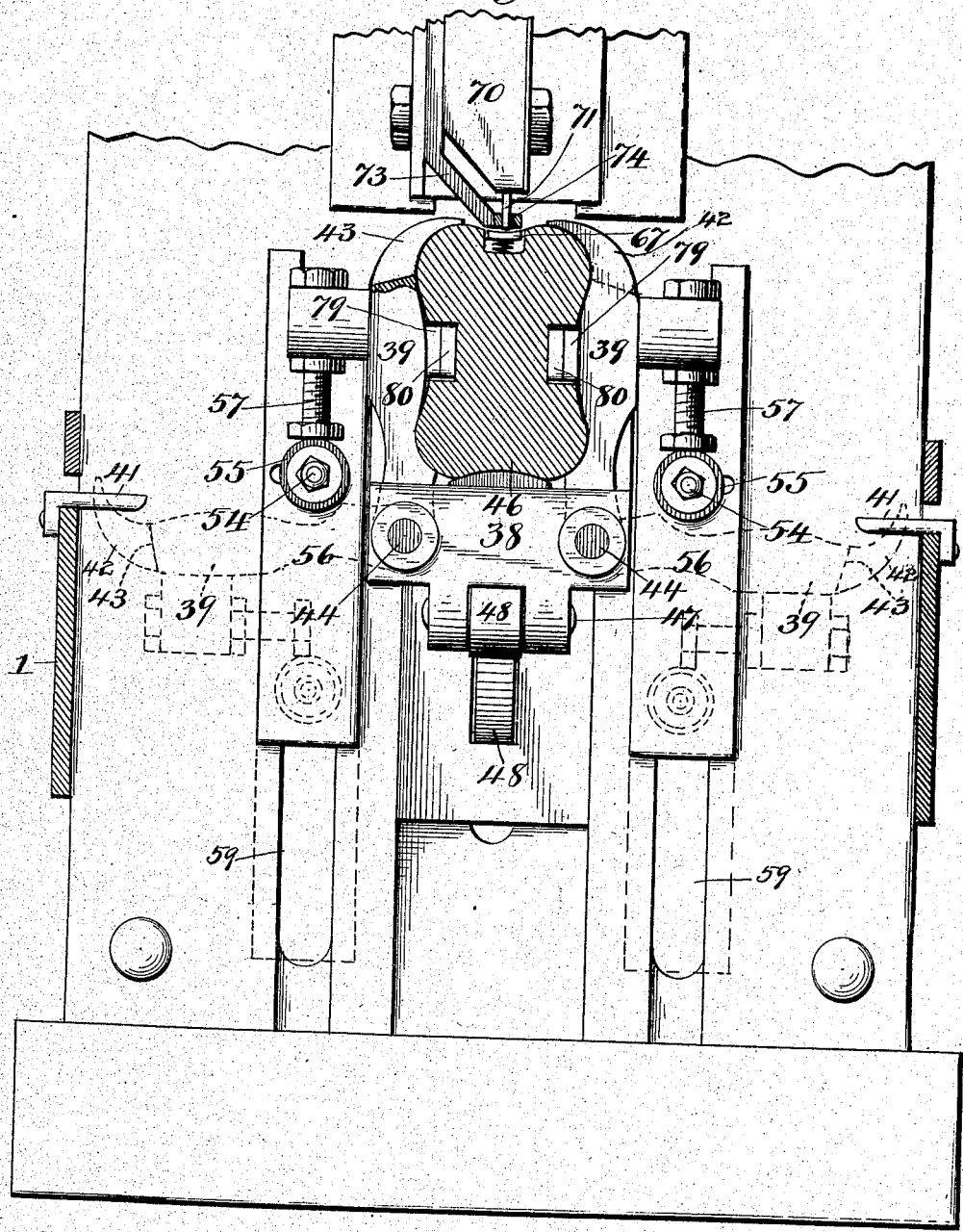

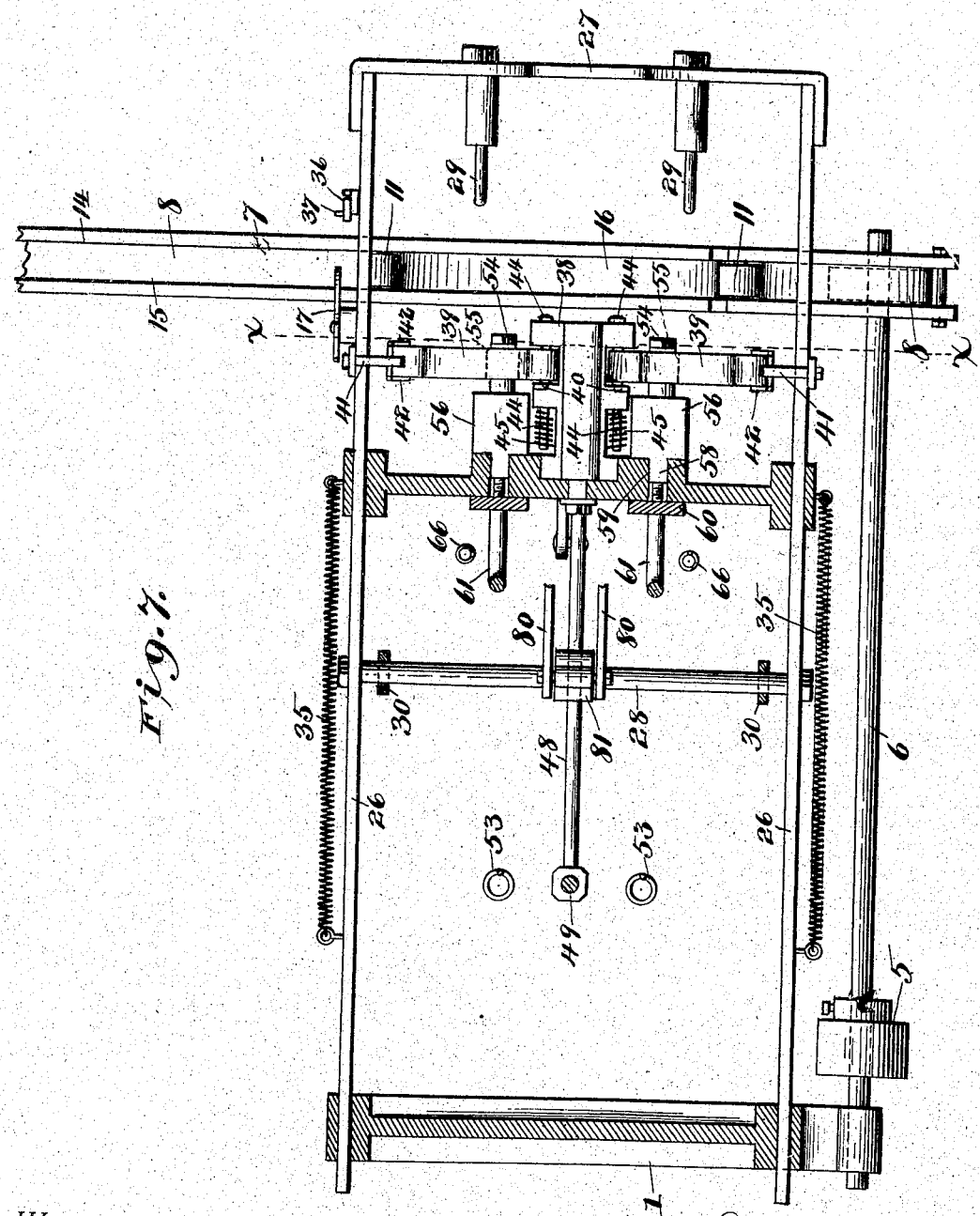

UNITED STATES PATENT OFFICE.

JULIUS BRENZINGER, OF NEW YORK, N. Y., ASSIGNOR TO MAX AMS MACHINE COMPANY, OF NEW YORK, N. Y., A CORPORATION OF NEW YORK.

MACHINE FOR MAKING CAN-BODIES.

No. 815,791.     Specification of Letters Patent.     Patented March 20, 1906.

Application filed October 14, 1902. Serial No. 127,286.    REISSUED

*To all whom it may concern:*

Be it known that I, JULIUS BRENZINGER, a subject of the German Emperor, and a resident of New York, in the county of New York and State of New York, having invented certain new and useful Improvements in Machines for Making Can-Bodies, of which the following is a specification.

My invention relates to machines for making can-bodies.

Metallic can-bodies having heads secured thereto by a doubled-edge and locked seam must have a flange formed at the edge to receive the turned-over edge of the head. Where the can-body itself has a doubled and locked seam, it is impracticable to form this flange on account of the fact that four thicknesses are formed at the seam of the can-body by the double locking. It is essential, therefore, that only a flat lapped joint be formed in the can-body when it is desired to lock the head thereto by a double-locked seam.

One object of my invention is to provide means to rapidly and automatically form a flat lapped joint in the can-body.

Another object of my invention is to securely and accurately lock the ends of the can-body together preliminarily to the sealing of the joint of the overlapped ends by solder, whereby not only may the solder be more thoroughly and accurately applied, but also an independent and auxiliary means of locking the joint is provided.

Another object of the invention is to provide means for heating each of the soldering-irons by a flame confined to and directly upon the iron without loss of heat and so arranged as to permit of easy regulation of the intensity of heat and having the supply of fuel conducted by simple and convenient means, such as will obviate a heater and pipe separate from the soldering-iron holder.

Another object of my invention is to effect by a connected arrangement and continuous operation of mechanisms a rapid production of can-bodies and to generally simplify and improve machines of this class.

To these ends my invention consists of the features and combinations hereinafter described, and pointed out in the claims.

The preferred embodiment of my invention is disclosed in the device herein described, and illustrated in the drawings; but my invention is not limited to the exact form of such embodiment, as it is clear that mechanical changes may be made without altering the character of the invention.

The device is illustrated in the accompanying drawings, in which—

Figure 2:
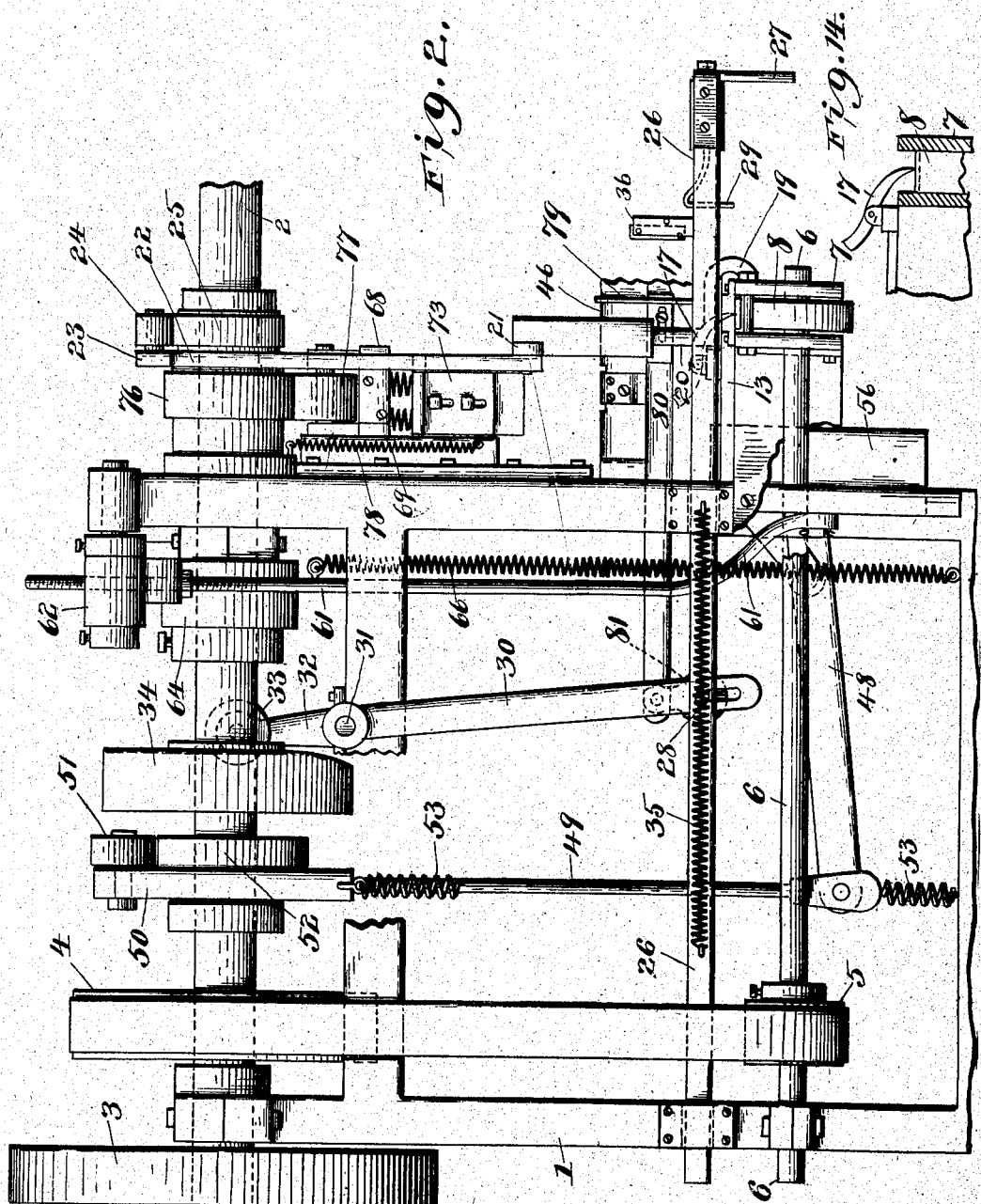
Figure 3:
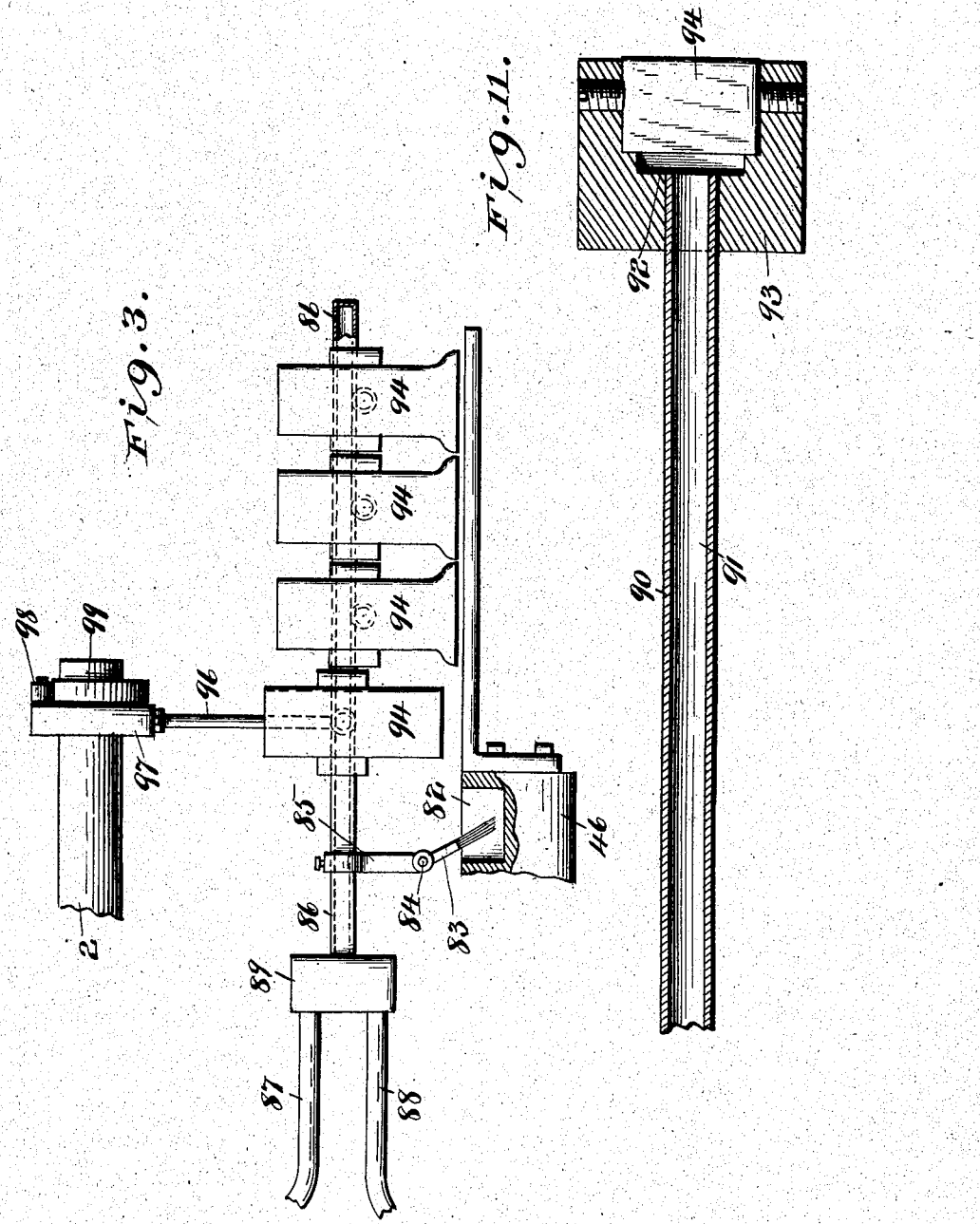
Figure 4:
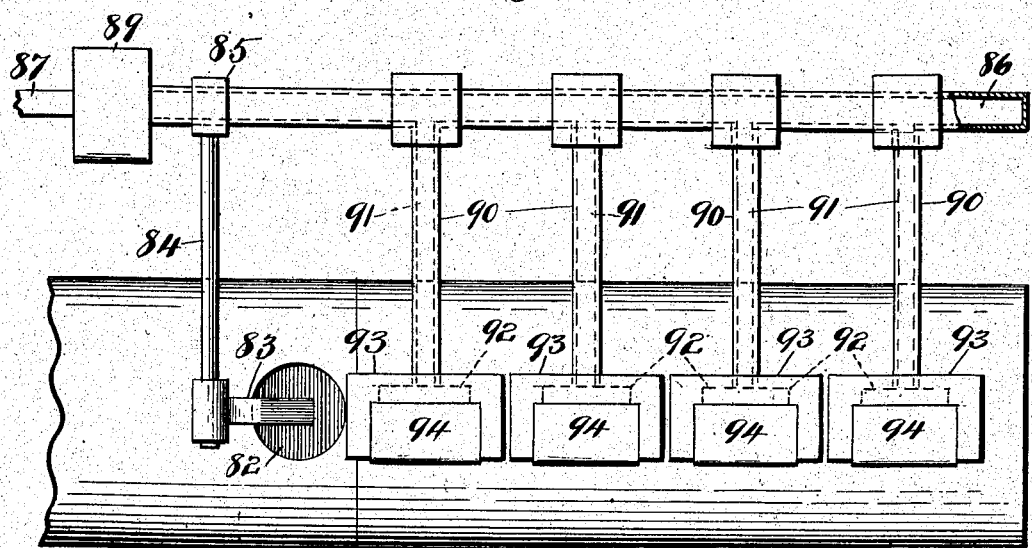
Figure 8:
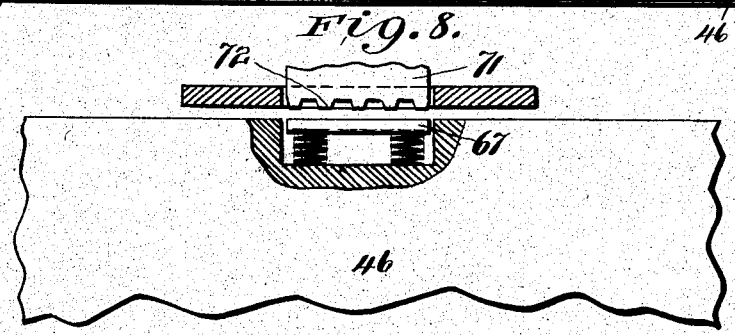
Figure 9:
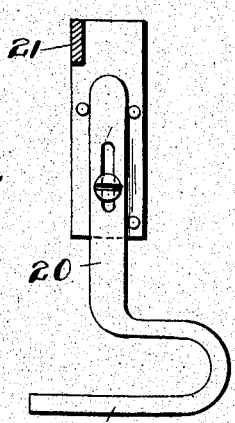
Figure 10:
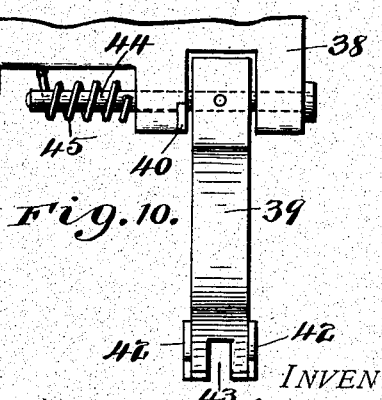

Figure 1 is a front view in elevation, partly in section, of the machine; Fig. 1ª, a continuation to the right of the lower part of Fig. 1; Fig. 2, a side view in elevation with the soldering mechanism not shown; Fig. 3, a side view in elevation showing a continuation of Fig. 2 and illustrating the soldering mechanism; Fig. 4, a plan view of the soldering mechanism; Fig. 5, a side view of the solder-wire-feeding mechanism; Fig. 6, an enlarged vertical section of the lower part of the machine on the line X X of Fig. 7; Fig. 7, a horizontal section on the line Y Y of Fig. 1; Fig. 8, a detail vertical section of the locking-punch dies; Fig. 9, a detail side view of one of the blank-lifting arms; Fig. 10, a detail plan view of one of the folding or bending wings; Fig. 11, a sectional detail of a soldering-iron holder; Fig. 12, a plan view of a sheet-metal blank before it enters the machine; Fig. 13, a perspective view of a can-body after formation, and Fig. 14 a detail view of the stop-latch.

*The driving mechanism.*—Referring to the drawings, 1 is the framework of the machine, in which are supported the operating mechanisms. Horizontally mounted in such frame, near the upper part thereof, is a main shaft 2, that is driven by a main driving-pulley 3, fixed on the shaft and connected to any suitable source of power. Fixed on the main driving-shaft is an auxiliary driving-pulley 4, connected by a belt to a pulley 5 on shaft 6, which constitutes the driving-shaft of the blank-feeding mechanism.

*The blank-feeding mechanism.*—Such mechanism is mounted in a housing 7, (see Figs. 1 and 7,) extending across the front of the machine, and consists of an endless conveyer-belt 8, mounted on and driven by main roller 9 and rollers 10 11, the rollers 10 being mounted in the upper part of the housing, so as to carry the belt at the feeding-level of the blanks, and the other rollers 11 being mounted in the lower part of the housing, so as to carry down the belt below the feeding-level of the blanks and leave spaces 12, in which the mechanism for lifting and transferring the blanks from the conveyer to the forming mechanism may work. The housing 7 is supported on horizontal arms 13, extending from the front of the machine and leaving a space between the housing and frame in which operate the forming and locking mechanisms. The housing is prolonged toward one side in order to form a blank-receptacle 14, in which the blanks are placed lengthwise one at a time upon the conveying-belt. This receptacle is not shown as to a separate structure, but it is merely formed by the two side walls and the end wall of the housing, as shown in side view in Fig. 1$^a$ at bottom of the sheet and in plan in Fig. 7.

The section 15 of the belt carries the blank forward on the belt-section 16, where it will rest over the spaces 12 and will be in position to be engaged by the transferring mechanism. A stop to hold the blank within the feed-receptacle and prevent it from being carried forward by the moving belt until the proper time is mounted on the housing at the inner end of the feed-receptacle 14 and consists of a pivoted latch 17, adapted to be raised by a trip on a moving part of the mechanism. A fixed stop 18 beyond the belt-section 16 prevents the blank from being carried too far and stops it in correct position for transference. The belt thus serves to position the blank in front of the horn, ready to be carried to the horn by the transferring mechanism.

*The blank-transferring mechanism.*—The transferring mechanism comprises a lifting device for raising the blank from the belt above the housing and the presser-block and a pusher for removing the blank from said lifting mechanism.

In the housing 7 are cut vertical slots in which are adapted to move the lifting-arms 19. (See Figs. 1, 2, and 9.) These arms rest normally below the feeding-level of the conveyer-belt and when raised engage and lift the blanks, and they have vertical extensions 20, connected to a lower cross-bar 21 of a vertically-reciprocating frame 22, provided with a top cross-bar 23, which carries a roller 24. The roller 24 bears upon a cam 25, mounted on the main shaft 2, and by this connection the lifting-arms are vertically reciprocated in the housing-slots.

Mounted horizontally in the main framework is a horizontally-sliding frame 26, (see Figs. 2 and 7,) having a connecting-arm 27 and a cross-bar 28. Extending inwardly from the connecting-arm 27 are pusher-arms 29, preferably in the form of depending hooks, so as to be adapted to strike against the edge of the blank and push the blanks inward. The cross-bar 28 of the sliding frame is engaged by vertical slotted levers 30, fixed to the end of a shaft 31, journaled in the main frame. On the shaft 31 is a fixed rocking arm 32, having a loose roller 33, adapted to bear upon a cam 34, fixed to the main driving-shaft 2. Coiled springs 35 are connected at their respective ends to the arms 26 near their rear ends and the front part of the main frame and serve to return the sliding frame to its normal position with the pusher-arms at their outermost point of travel. By the above driving connection of the cam on the main driving-shaft with the sliding frame and by the return-springs the pusher-arms 29 are horizontally reciprocated in and out just above the level of the conveyer-belt, whereby they will push the blank from the lifter-arms onto the presser-block.

One of the side arms of the sliding frame 26 is provided with a pivoted trip 36, having a pin 37, adapted to engage and raise the stop-latch 17 at the end of the receptacle when the sliding frame is carried inward by the cam, and thus permit another blank to be fed out of the receptacle by the belt. On the return of the sliding pusher-frame the trip yields to the latch and moves past without raising the latter.

*The forming mechanism.*—The blanks are pushed from the lifter directly onto the presser-block 38 and are laid transversely thereof in such position that they will extend over folding-wings 39. (See Figs. 6 and 7.) The blanks are limited in their rearward movement by the uprights 40, which form stops and guides, and they rest upon the horizontal lugs 41, so as to be sustained without bending above the curved folding-wings. Each wing is of the proper width to fit the blanks and is provided on each side with outside guide-lugs 42, extending above the ends of the wings and adapted to embrace the blanks and to hold them in correct position on the wings. (See Figs. 6, 7, and 10.) Each wing is also provided with a slot 43, extending through its end to enable the wing to pass the fixed lug 41. Each folding-wing is fixed on a shaft 44, journaled in the block and provided with a coiled return-spring 45, having one end bearing against a pin on the shaft and the other end against the block, so as to tend to hold said wing down in horizontal position and to give it a quick return.

Fixed to the frame of the machine above the block and extending horizontally forward is a forming or supporting horn or mandrel 46 of the proper shape to give the desired form to the box or can to be made. The horn has longitudinal grooves or depressions in the sides and top and bottom in order that the proper bend may be given to the blanks. The block 38 is movable up and down relatively to the horn to carry the blank against the latter, and to this end the block is provided with depending lugs carrying a pin 47, to which is pivotally connected the end of a lever 48, pivoted between its ends to a part of the frame and having its other end pivoted to a vertically-reciprocating rod 49, secured to a frame 50, which carries a roller 51. This roller bears upon an actuating-cam 52, fixed on the main driving-shaft 2. Return-springs 53 (shown partly broken away in Fig. 2) are connected to the frame 50 and to the base of the machine, and serve to give the rods a quick downward return after they have been actuated by their rollers.

When the main shaft and cam are rotated, the block 38 will be moved up and down to alternately force the blank against the horn and release its grip thereon. After the blank has been pressed against the horn the folding-wings are swung to raise the blank and bend it around the horn.

The wings are operated by studs 54, having loose outer rollers 55 and extending from vertically-sliding guide-blocks 56. The wings are provided with lugs or bolts 57, which bear against the rollers of the studs. The guide-blocks are provided with tongues 58, that extend through guideway-slots 59 in the main frame and carry by a bolt connection backing-plates 60. (See Figs. 6 and 7.) To each of these plates is separately pivotally connected a rod 61, pivotally hung at its upper end to a rocking bar 62, which is pivoted at one end and provided between its ends with a stud on which is journaled a roller 63, adapted to bear upon a cam 64, common to the rollers of both rocking bars and fixed to the main shaft. Each folding-wing thus has its independent actuating-roller and connecting mechanism, although an operating-cam common to both rollers is employed.

It is necessary that one folding-wing should be started in the folding operation slightly before the other in order that the ends may overlap, and to accomplish this result the rocking bars 62 are provided with elongated slots 65 to receive the studs of the rollers, and the studs are so adjusted in these slots that one roller will be in advance of the other in relation to the rotation of the cam.

Return-springs 66 are connected to the vertical connecting-rods 61.

After the ends of the blank have been bent over one upon the other they are locked together without bending the edges in order to hold the ends in place during the operation of soldering to enable the solder to be more efficiently applied and to also serve as a means of fastening the ends additional to and independent of the solder. To this end the horn is provided in its upper surface with a spring-pressed die 67, (shown in Fig. 8,) which is adapted to coact with a vertically-reciprocating punch slidably mounted in the frame above the horn. This punch comprises a sliding block 68, mounted to slide in a guideway 69 in the frame and carrying a head 70, in which is fixed a punch-die 71. The punch-die 71 is provided on its lower end with a tooth or series of teeth 72. On the punch-head is a yielding stripper-plate 73, mounted in the head by bolts passing through elongated slots in the plate and having pressure means of springs or rubber placed between the upper end thereof and the sliding block 68. The punch-die passes through a slot 74 in the foot of this stripper-plate. This stripper-plate by reason of the spring-pressure thereon and its sliding connection with the punch-head will maintain a pressure upon the blank as the punch-die is being raised and withdrawn from the blank, so as to strip and free the latter from the die, and thus prevent the punch from dragging upward the blank or separating the ends thereof. The teeth in the end of the punch-die form punched-in projections 75 in both overlapping ends of the blank that hold the ends firmly locked one upon the other.

The punch is forced down by a cam 76 on the main shaft 2 acting upon a roller 77, journaled in the sliding punch-block 68. The punch is raised by vertical return-springs 78, secured at their lower ends to block 68 and at their upper ends to a part of the fixed framework.

The locking of the ends of the can-body by the punched-in projections is sufficient to hold the can-body in shape without other means of fastening; but solder is then applied to the joint in the continued operation of the machine, and not only is a tight seam thereby produced, but also the permanency and security of the lock increased.

*The can-body-shifting mechanism.*—The can-body having been formed and locked on the horn, it is then to be moved along the horn to the point of application of the solder and to make room for a new blank. The means for shifting the can-body consist of a horizontally-sliding plunger comprising vertical fingers 79, each embracing a side and part of the top of the horn, so as to conform to the shape thereof, which fingers are carried by horizontal arms 80, slidably mounted in channels in the horn. The arms 80 pass through the front part of the framework and are connected at their inner ends to a lug 81 on the cross-bar 28 of the sliding frame 26, whereby when the frame and its cross-bar are returned to outermost position the plunger will be thereby carried outward in the channels of the horn and move the can-body along to the place of soldering.

*The soldering mechanism.*—In the upper surface of the horn there is formed a basin 82, (shown in Fig. 3,) adapted to contain a suitable acid or other solder-flux that is designed to be applied automatically to the joint of the can-body by a brush 83, depending into the basin, so that the can-body will be wiped under and against the same. The brush is pivotally hung at its upper end to a rod 84, carried by an arm 85, fixed on a tube 86, extending from the frame of the machine. The tube forms a conduit for a gaseous fuel mixture. A gas-pipe 87 and an air-pipe 88 lead to a mixing-chamber 89, connected to the tube, and supply gas and air for the mixture supplied to the heater that serves to heat the soldering-iron. Extending horizontally from the tube 86 are the heaters 90, each comprising a hollow pipe 91, opening at 92 into a housing 93, in which is removably clamped transversely of the housing a soldering-iron 94. The gaseous mixture is ignited at the opening 92, and the flame-jet is confined within the housing and projected directly against the soldering-iron. By this construction of heater the heat may be easily regulated and kept constant without dispersion by exposure to the force of drafts and the soldering-iron may be easily and quickly removed and attached to the heater. By having the support of the heater serve as a pipe for the gaseous mixture a convenient arrangement is obtained.

A plurality of soldering-irons are provided for the purpose of insuring thoroughness in the melting and application of the solder. The first of these irons in the direction of movement of the can-body on the horn is provided with mechanism to intermittently move it vertically, while the remaining soldering-irons are loosely hung. The pipe-support of the first iron is pivotally mounted at 95, and its support is connected to a rod 96, hung on a frame 97, which carries a roller 98, bearing upon and actuated by a cam 99 on the main driving-shaft 2. This soldering-iron is adapted to come in contact with and melt the solder-wire 100, and to enable the wire to be fed intermittently thereunder is provided with its vertically-reciprocating movement. When the first soldering-iron descends, it melts off a piece of solder from the solder-wire 100 and the seam of the can-body passing under the iron the solder will be melted and applied thereto. A spring or springs 101 hold the can-body firmly down on the horn and the ends closely together while the solder is being applied.

The solder-wire is fed intermittently forward through a tube 102 by means of a feed-roller 103, carrying at one end a ratchet-wheel 104, adapted to be actuated by a spring-pressed pawl 105, carried on a rocking frame 106, which is operated by a lever 107. This lever at its opposite end carries a roller 108, that bears on a cam 109 on the main shaft 2, whereby the lever and rocking arm are rocked to move the ratchet and rotate the feed-wheel. A pressure-roller 110 bears against the wire opposite the feed-roller and is yieldingly mounted on the pin of a link 111, which is pressed against by a spring 112. A return-spring is secured at one end to a fixed part of the frame and at the other end to a right-angled extension from arm 107.

After the solder has been applied to the seam the can-body is forced along the horn by the succeeding cam and passes under the auxiliary soldering-irons, by which the joint is effectually sealed. The can-body is then removed from the horn by any suitable means and is ready to be flanged and headed.

*The general operation of the machine.*—All the operating parts are driven from the main shaft—the blank-feeding mechanism by a pulley and belt and the other mechanisms by cams. The blank is fed from the feed-receptacle by the conveyer-belt 8 upon the lifter-arms 19, which are thereupon operated to raise the blank above the feed-channel, whereupon the sliding pusher-arms 29 push the blank from the lifter onto the presser-block 38. The block is then lifted by its cam mechanism, so as to carry the blank against the forming-horn 46, and immediately thereafter the folding-wings 39 are swung upon their pivots by their sliding blocks 56, and the blank is carried up thereby and bent around the horn to form the can-body, one wing acting in advance of the other, so as to cause the ends of the blank to overlap. The punch then descends and forms the engaging projections, whereby the ends of the can-body are locked firmly together without hooking or doubling the edges, thereby leaving a flat surface, with only two thicknesses at the seam. The can-body so formed and locked is then carried forward on the horn by the action of the sliding plunger-fingers 79 to the soldering mechanism, where the solder is applied by the irons 94, held in the heaters 90, and then the can-body is removed from the horn.

A locked can-body is shown in Fig. 13. It will be seen that the end portions 113 of the body are locked flat, one upon the other, with their end edges 114 unbent and the side edges 115 also in an unbent continuous condition, whereby only two thicknesses of metal are formed at the edges that have to be turned over when the head is applied with the double seam.

It is clear that various changes in the mechanical details of the machine may be made without departing from the scope of my invention, which is not confined to the precise embodiment thereof herein shown and described.

Having thus described my invention, what I claim is—

1. A machine for making can-bodies having a mechanism for overlapping the end portions of a blank flat one upon the other, a locking-punch for locking said end portions together with unbent continuous side edges and flat outer surface, substantially as described.

2. In a machine for making can-bodies, in combination with a mechanism for overlapping the end portions of the body flat one upon the other, a punch extending parallel to the end edges and short of the side edges for forming interlocking projections in the end portions, whereby said end portions are locked together flat one upon the other with unbent side edges, substantially as described.

3. A machine for making can-bodies, having a forming-horn, in combination with successively-operating blank-folding and end-overlapping wings, a lock-forming punch operative between the end edges of the blank, and means to operate said punch while the end portions are held lapped one upon the other to lock the same together with unbent side edges, substantially as described.

4. A machine for making can-bodies, having a forming-horn, in combination with successively-operating blank-bending wings, a vertically-reciprocating punch, said punch having a toothed die, and a coöperating die in said horn, substantially as described.

5. A machine for making can-bodies, having in combination with a forming mechanism, a lock-forming punch, provided with a toothed die, and a stripper on said punch, substantially as described.

6. A machine for making can-bodies, having a forming mechanism, in combination with a lock-forming punch, a stripping-plate slidably mounted on said punch, and yielding pressure means bearing on said stripping-plate, and means to vertically reciprocate said punch, substantially as described.

7. A machine for making can-bodies, having in combination a forming mechanism, means for overlapping the end portions of the body flat one upon the other, a punch operating between the end edges for locking the end portions together in flat lapped parallel arrangement with unbent side edges, and a soldering mechanism for the lap-joint, substantially as described.

8. A machine for making can-bodies, having in combination a forming-horn, means for forming the can-body on said horn, a toothed punch operating between the end edges of the lapped portions to lock said portions together with unbent side edges, a soldering mechanism, and a body-shifting plunger, substantially as described.

9. A machine for forming can-bodies, having a forming-horn, in combination with a lapped-end-bending mechanism, a locking mechanism consisting of a vertically-reciprocating toothed punch whereby the ends of the can-body are locked without bending the edges, a soldering mechanism, and a plunger for shifting the locked can to the soldering mechanism, substantially as described.

10. A machine for making can-bodies, having a blank-feeding mechanism, in combination with a body-forming mechanism, comprising means for lapping the ends flat, one upon the other, a transferring mechanism between the feeding and forming mechanisms, means for locking the ends in said lapped position with continuous side edges whereby only two thicknesses are formed at the junction of the body, a soldering mechanism, and a means for shifting said locked can-body to said soldering mechanism, substantially as described.

11. A machine for making can-bodies, having a main shaft, in connection with a lapped-end body-forming mechanism, a lock-forming piercing-punch, operating between the end edges of the lapped-end portions, cams on said main shaft for successively operating said mechanisms, and a soldering mechanism, substantially as described.

12. A machine for making can-bodies, having a blank-feeding mechanism, consisting of an endless conveyer, rolls for operating said conveyer, in combination with a feed-receptacle through which said conveyer passes, a blank-stop, and means to release said blank-stop, substantially as described.

13. A machine for making can-bodies, having a blank-feeding conveyer-belt, a series of upper and a series of lower rollers for said belt, whereby the belt will be carried below the feeding-level at intervals, and a lifting mechanism operating in the spaces at said intervals to raise the blank from and above the conveyer, substantially as described.

14. A machine for making can-bodies, having a blank-receptacle, a blank-feeding conveyer-belt, leading from said receptacle and transversely to the forming-block, in combination with a blank-lifting mechanism, and a pusher for moving the blank from the lifter to the forming-block, substantially as described.

15. A machine for making can-bodies, having in combination a horizontally-traveling conveyer-belt, vertically-reciprocating lifter-arms, and a sliding pusher-frame operating transversely to the belt, substantially as described.

16. A machine for making can-bodies, having a conveyer-belt, in combination with lifter-arms movable in interrupted spaces in the belt, a horizontally-sliding pusher-frame, a main shaft, and cams on said shaft for vertically raising said lifter-arms, and sliding said frame, substantially as described.

17. A machine for making can-bodies, having a forming-block, means for positioning a blank in front of said block, a horizontally-sliding frame adapted to push said blank from said positioning means to said block, arms on said frame adapted to contact with the blank to move it in one direction, and plunger-fingers also carried by the frame to move the blank in the opposite direction, in combination with an actuating rocking lever for the frame, a main shaft, and a cam on said main shaft which operates said lever, substantially as described.

18. A machine for making can-bodies, having a forming-block, means for positioning a blank in front of said block, a horizontally-sliding frame adapted to push said blank from said positioning means to said block, arms on said frame adapted to contact with a blank to move it in one direction and plunger-fingers also carried by the frame to move it in the opposite direction, in combination with actuating rocking levers for the frame, a main shaft, a cam on said main shaft for rocking said levers and sliding the frame in one direction, and a spring for sliding the frame in the other direction, substantially as described.

19. A machine for making can-bodies having a fixed forming-horn, in combination with a vertically-movable presser-block below said horn, a blank-feeding belt extending parallel with the width of said block, means to feed a single blank at a time by said belt, vertically-movable arms for lifting said blank from said belt, and a horizontal, reciprocating pusher-frame for pushing said blank from said lifting-arms to said block, substantially as described.

20. A machine for making can-bodies, having a forming-horn, in combination with pivotally-swinging blank-bending wings, vertically-sliding blocks separate from said wings, said blocks provided with studs, said wings adapted to bear on said studs, a vertically-moving rod for each sliding block, a rocking mechanism for each rod, separate, successively-operated rollers for each rocking mechanism, and means for operating said rollers, substantially as described.

21. A machine for making can-bodies, having a forming-horn, in combination with successively-actuated blank-bending wings, each operated by an adjustable roller bearing upon a cam common to both rollers, said rollers having their centers out of line, substantially as described.

22. A machine for making can-bodies, having a forming-horn, in combination with blank-bending wings, independent successively-actuated rollers for said wings, connections between each roller and its wing, and a cam common to both rollers for actuating the same, a toothed punch for locking the flat lapped ends of the can-body and a cam for actuating said punch, and means for successively operating said wing-cam and punch-cam, substantially as described.

23. A machine for making can-bodies, having a forming-horn, in combination with a presser-block, a reciprocating sliding pusher-frame, operated in one direction to move a blank to said block, means for operating said pusher-frame, a can-body-shifting plunger, said plunger connected to said pusher-frame, and operated in the opposite direction to shift a can on said horn by the return movement of said frame, substantially as described.

24. A machine for making can-bodies, having blank-bending wings, in combination with fixed horizontal blank-supporting lugs alined with and independent of said wings and vertical stops for the blank at the edges of the lugs, substantially as described.

25. A machine for making can-bodies, having blank-bending wings provided with recesses and guide-lugs at each end on each side thereof, substantially as described.

26. A machine for making can-bodies, having a soldering mechanism provided with a plurality of soldering-irons, means to positively reciprocate one of said irons vertically, the remainder of said irons being loosely hung, in combination with means for feeding a strip of solder under said reciprocating iron, substantially as described.

27. A heater for soldering-irons having a housing for the iron, a hollow conduit-support, an opening into the housing from said conduit-support, and said conduit-support being suitably connected to a suitable source of fuel-supply, substantially as described.

28. A machine for making can-bodies having a solder-feed mechanism consisting of a feed-roller and a pressure-roller, a rocking frame, a solder-guide tube carried by said frame, a ratchet-wheel on said feed-roller, a ratchet on said frame, and a cam for actuating said frame, whereby, when the frame is rocked in one direction the solder will be advanced by the roller and when rocked in the opposite direction the tube will be withdrawn to expose a portion of the solder, substantially as described.

29. A machine for making can-bodies, having in combination a blank-feeding mechanism, a blank-lifting mechanism, a pushing mechanism, a mechanism for forming a can-body with lapped ends, and flat, unbent edges, a lock-forming punch to lock said body in such form, a can-body-shifting mechanism, and a soldering mechanism, substantially as described.

In testimony whereof I have herein affixed my signature in the presence of two witnesses.

JULIUS BRENZINGER.

Witnesses:
JAS. H. BLACKWOOD,
H. P. DOOLITTLE.